(12) United States Patent
Hibshoosh et al.

(10) Patent No.: US 10,361,865 B2
(45) Date of Patent: Jul. 23, 2019

(54) SIGNATURE METHOD AND SYSTEM

(71) Applicant: Cisco Technology, Inc., San Jose, CA (US)

(72) Inventors: Eliphaz Hibshoosh, Tel Aviv (IL); Aviad Kipnis, Efrat (IL); Nir Moshe, Jerusalem (IL); Alon Shaltiel, Jerusalem (IL); Yair Fodor, Petah-Tikva (IL)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 15/688,894

(22) Filed: Aug. 29, 2017

(65) Prior Publication Data

US 2018/0219682 A1 Aug. 2, 2018

(30) Foreign Application Priority Data

Jan. 30, 2017 (IL) .......................................... 250359

(51) Int. Cl.
*H04L 9/32* (2006.01)
*H04L 9/00* (2006.01)
(Continued)

(52) U.S. Cl.
CPC ............ *H04L 9/3236* (2013.01); *G06F 21/53* (2013.01); *G06F 21/64* (2013.01); *H04L 9/3247* (2013.01); *G06F 2221/2149* (2013.01)

(58) Field of Classification Search
None
See application file for complete search history.

(56) References Cited

U.S. PATENT DOCUMENTS 6,292,897 B1 * 9/2001 Gennaro .................. H04L 9/321
713/156
6,311,271 B1 10/2001 Gennaro et al.
(Continued)

FOREIGN PATENT DOCUMENTS

WO 1999040702 8/1999

OTHER PUBLICATIONS

Yoon H., Cheon J.H., Kim Y. (2005) Batch Verifications with ID-Based Signatures. In: Park C., Chee S. (eds) Information Security and Cryptology—ICISC 2004. ICISC 2004. Lecture Notes in Computer Science, vol. 3506. Springer, Berlin, Heidelberg (Year: 2005).*

(Continued)

*Primary Examiner* — Alexander Lagor

(57) ABSTRACT

In one embodiment, a method, system, and apparatus are described, the method, system, and apparatus including generating metadata to be associated with each block of a series of blocks, the generating including, except for an initial block, receiving: a first block, including a signed block, and a second block to be signed, retrieving a first value including a square of a random number, R'2, multiplying R'2 by a nonce, r, and setting r·R'2 to be a square of a first random number, denoted R2, for the second block, retrieving a second value from the first block, the second value including K-bit vector, E', determining a bit string value of the second block, M, computing E=hash(R2||M||E'), and determining a signature, Sig, for the second block by calculating Sig=r Sig' SE-E'. Related methods, systems, and apparatuses are also described.

20 Claims, 5 Drawing Sheets

(51) Int. Cl.
  *G06F 21/00* (2013.01)
  *G06F 21/64* (2013.01)
  *G06F 21/53* (2013.01)

(56) References Cited

U.S. PATENT DOCUMENTS

| | | | |
|---|---|---|---|
| 7,340,602 B2 | 3/2008 | Serret-Avila | |
| 7,890,763 B1* | 2/2011 | Law | G06Q 20/401 |
| | | | 705/75 |
| 8,078,877 B2* | 12/2011 | Cheon | G06F 7/724 |
| | | | 380/28 |
| 8,255,691 B2* | 8/2012 | Yi | H04L 9/14 |
| | | | 380/30 |
| 8,285,996 B2* | 10/2012 | McCullagh | H04L 9/3247 |
| | | | 380/277 |
| 2005/0050332 A1 | 3/2005 | Serret Avila et al. | |

OTHER PUBLICATIONS

Lim C.H., Lee P.J. (1995) Server(Prover/Signer)-Aided Verification of Identity Proofs and Signatures. In: Guillou L.C., Quisquater JJ. (eds) Advances in Cryptology—Eurocrypt '95. Eurocrypt 1995. Lecture Notes in Computer Science, vol. 921. Springer, Berlin, Heidelberg (Year: 1995).*

Bellare, M., Namprempre, C. & Neven, G. J Cryptol (2009) Security Proofs for Identity-Based Identification and Signature Schemes Journal of Cryptology Jan. 2009, vol. 22, Issue 1, pp. 1-61 (Year: 2009).*

Camenisch J., Hohenberger S., Pedersen M.Ø. (2007) Batch Verification of Short Signatures. In: Naor M. (eds) Advances in Cryptology—Eurocrypt 2007. Eurocrypt 2007. Lecture Notes in Computer Science, vol. 4515. Springer, Berlin, Heidelberg (Year: 2007).*

Bellare M., Garay J.A., Rabin T. (1998) Fast batch verification for modular exponentiation and digital signatures. In: Nyberg K. (eds) Advances in Cryptology—Eurocrypt'98. Eurocrypt 1998. Lecture Notes in Computer Science, vol. 1403. Springer, Berlin, Heidelberg (Year: 1998).*

Ferrara A.L., Green M., Hohenberger S., Pedersen M.Ø. (2009) Practical Short Signature Batch Verification. In: Fischlin M. (eds) Topics in Cryptology—CT-RSA 2009. CT-RSA 2009. Lecture Notes in Computer Science, vol. 5473. Springer, Berlin, Heidelberg (Year: 2009).*

Gennaro, Rosario et al.; How to Sign Digital Streams; revised version Feb. 24, 1998.

Golle, Philippe et al.; Authenticating Streamed Data in the Presence of Random Packet Loss; In NDSS, vol. 1, pp. 13-22. 2001.

Perrig, A. et al.; Timed Efficient Stream Loss-Tolerant Authentication (TESLA): Multicast Source Authentication Transform Introduction; TESLA RFC4082; The Internet Society, Jun. 2005.

Sridevi, J. et al.; Efficient Multicast Packet Authentication Using Digital Signature; Proceedings published by International Journal of Computer Applications® (IJCA) International Conference on Emerging Technology Trends (ICETT) 2011.

* cited by examiner

SIGNATURE METHOD AND SYSTEM

TECHNICAL FIELD

The present disclosure generally relates to methods and systems for implementing digital signatures.

BACKGROUND

In many networks efficient use and testing of message authenticity is an important requirement to establish trust in the network. Often the network is comprised of many communicating (signing) nodes (devices/users) some of which are computationally-constrained such that the ability of those computationally-constrained nodes to sign and verify messages is greatly limited. Efficient generation of signatures and fast verification of the signed messages are important to enhance message authenticity in the network.

Batch-verification of signed messages is useful, as a successful verification of a single signature ensures the authenticity of many messages. Conversely, a failed verification of a single message during batch-verification indicates that at least one message was ill-signed. In such a case, performing verification on each one of the batch verified messages enables pin-pointing the source of the rogue messages.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a method, system, and apparatus are described, the method, system, and apparatus including generating metadata to be associated with each block of a series of blocks, the generating including the following, except for an initial block, receiving: a first block, including a signed block of a content item, and a second block including a block of a content item to be signed, retrieving a first value from the first block, the first value including a square of first a random number, $R'^2$, multiplying $R'^2$ by a nonce, r, thereby determining $r \cdot R'^2$, and setting $r \cdot R'^2$ to be a square of a first random number, denoted $R^2$, for the second block, wherein R is a mod N number in a field, $Z^*N$, retrieving a second value from the first block, the second value including K-bit vector, E', determining a bit string value of the second block, M, computing $E=\text{hash}(R^2\|M\|E')$, where E includes a K-bit vector, and determining a signature, Sig, for the second block by calculating $\text{Sig}=r \cdot \text{Sig}' \cdot S^{E-E'}$, where S includes a secret set of mod N values, such that, $S=\{S_1, S_2, S_3, \ldots S_j, \ldots S_k\}$, where $S_j$ is a random value in the field, and Sig' is the signature of the first block, performing the generating metadata steps above for the initial block where, for the first block, the values of $R'^2$, E', and Sig' are each respectively set to non-zero arbitrary values, and associating the metadata with each block of the series of blocks.

In another embodiment, a method, system, and apparatus are described, the method, system, and apparatus including receiving two blocks of streamed data including a first block and a second block, receiving metadata associated with each one of the two blocks of streamed data and metadata associated with a third block which is immediately previous to the first block, authenticating the received two blocks by performing the following steps on the received metadata retrieving a square of first a random number, $R'^2$, from the metadata associated with the second block, wherein R' is a mod N number in a field, $Z^*N$, retrieving a bit string value, M', from the metadata associated with the second block, retrieving a K-bit vector, E", such that $E''=(e''_1, e''_2, e''_3, \ldots, e''_k)$ from the metadata associated with first block, calculating $\text{Hash}(R'^2\|M'\|E'')$, and comparing the calculated value of $\text{Hash}(R'^2\|M'\|E'')$ with a value of a K-bit vector, E', retrieved from the second block, such that $E'=(e'_1, e'_2, e'_3, \ldots, e'_k)$, wherein if $E'=\text{Hash}(R'^2\|M'\|E'')$, the second block has been authenticated.

Related methods, systems, and apparatuses are also described.

Example Embodiment

Figure 1:
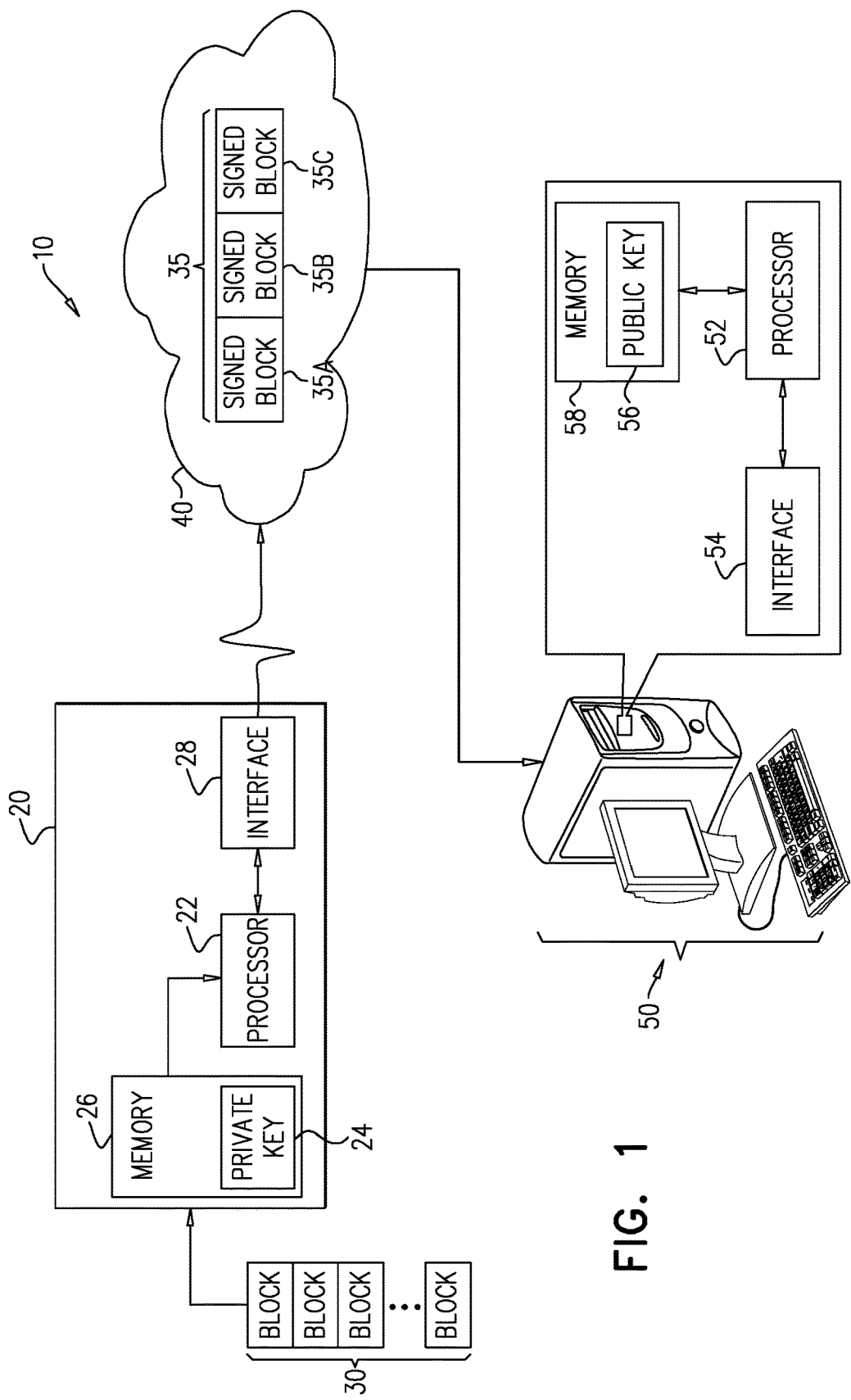
FIG. 1 is a block diagram that schematically illustrates a data communication system in which messages are authenticated using a public-key signature, in accordance with an embodiment of the present disclosure.

Reference is now made to FIG. 1, which is a block diagram that schematically illustrates a data communication system in which messages are authenticated using a public-key signature, in accordance with an embodiment of the present disclosure. A system for digitally signing a message comprises a Feige-Fiat-Shamir-based signature method with efficient, aggregated-signature generation. For live streams of data, for example, and without limiting the generality of the foregoing, live video streams, embodiments of the present system enable: signing the live video stream; and verifying/authenticating any segment of the live video stream of arbitrary length (i.e. a time interval t1 to t2 and comprised of multiple blocks of data), the verification not requiring data of any other time interval of the stream. For a non-live stream of data (e.g., a recorded video) embodiments of the present system enable: signing the non-live stream; and allowing a verifier of the non-live stream to skip to any arbitrary segment of the stream (i.e. a time interval t1 to t2 and comprised of multiple blocks of data) and to authenticate the chosen arbitrary segment of the stream before display thereof. When a signer signs a live stream of data comprising many messages, where each message is a block of data, an efficient real-time verification of an arbitrary number of consecutive blocks of data, being a segment of the stream, with negligible latency, is an enabler of data authentication prior to consumption.

Typically, verification systems utilize portions of the stream of data outside of a segment to be verified. However, using segments outside of the stream of data to be verified entails causing latency and/or requires multiple signature-verifications in the case of a non-live stream. In many cases where the stream must be authenticated before it is consumed (by an application or by display) such delays are not acceptable.

By way of example of video streams requiring authentication or verification:

Signals from many security cameras are transmitted twenty-four hours a day, seven days a week, and the validity of certain segments of the transmitted data stream may relate to a crime event of 5 minutes duration. Certain segments must be verified as authentic—produced by one of the many security cameras and not tampered with subsequently.

Video signals from production or other video systems may be transmitted over open or semi-open networks. A receiver of such transmitted video typically desires assurance that some critical segments of the video have not been tempered with.

DVB (Digital Video Broadcast) standards, at present, lack solutions against man-in-the-middle attacks in broadcast systems where rogue (i.e. illegally obtained) video or other application streams are fed into client devices (set top boxes (STBs), for example) which do not verify their input stream.

Returning to the discussion of FIG. 1, a system 10 is shown to illustrate a typical configuration in which aggregated digital signatures may be used. The depiction of FIG. 1 is described herein by way of example and is not meant to limit the application of such signatures to the configuration described herein.

In the embodiment depicted in FIG. 1, a signing device, such as a signer 20, may comprise a general-purpose computer or other appropriate computing device. The signer 20 is, in the embodiment of FIG. 1, operative to receive and sign one of: a continuous, real-time ("live"), data stream, such as a video stream; or a non-live data stream (e.g., a recorded video). Such a data stream, will be referred to hereinafter as data stream 30 regardless of whether the data stream 30 comprises a real-time data stream or a non-live data stream. In cases where a distinction between the two types of data streams is significant, each one type of the data stream 30 will be individually singled out and discussed.

The signer 20 transmits data over a network 40 to a receiving device 50. Receiving device 50 may comprise a general-purpose computer or other computing device, such as, but not limited to, a hand held computing device, such as a tablet or smart phone.

In the example shown in FIG. 1, a processor 22 in signer 20 signs data blocks of the data stream 30. The signed blocks 35A, 35B, 35C of the data stream 30 are transmitted over the network 40 to the receiving device 50. Using a private key 24 that is stored in a memory 26, the processor 22 computes a signature for each signed block 35A, 35B, 35C of the signed blocks of the data stream 30. The signature of each signed block 35A, 35B, 35C incorporates data from the signature of its preceding block, as will be explained below. By way of example, the signature of signed block 35C incorporates data from the signature of signed block 35B. Similarly, the signature of signed block 35B incorporates data from the signature of signed block 35A. The signer 20 transmits signed blocks of the data stream 30 via an interface 28 over the network 40 to the receiving device 50.

A second processor 52 associated with the receiving device 50 receives signed blocks of the data stream 30 via a second interface 54. The second processor 52 uses a public key 56, which is stored in a second memory 58 (used by the second processor 52) in order to verify the signatures of the blocks of the data stream 30. Accordingly, the receiving device 50 may be referred to, herein below, as the "verifier".

Typically, both the processor 22 and the second processor 52 comprise general-purpose computer processors, which may be programmed in software to carry out the functions that are described herein. The software may be downloaded to either of the processors in electronic form, over a network, for example. Alternatively or additionally, the software may be provided on tangible, non-transitory storage media, such as optical, magnetic, or electronic memory media. Further alternatively or additionally, some or all of the described processing functions may be performed by special-purpose or programmable digital logic circuits.

For efficient processing, the processor 22 may comprise dedicated hardware logic circuits, in the form of an application-specific integrated circuit (ASIC), field programmable gate array (FPGA), or full-custom integrated circuit, or a combination of such devices. Alternatively or additionally, some or all of the functions of the processor 22 may be carried out by a programmable processor, such as a microprocessor or digital signal processor (DSP), under the control of suitable software. The software may be downloaded to the processor in electronic form, over a network, for example. Alternatively or additionally, the software may be stored on tangible storage media, such as optical, magnetic, or electronic memory media. The second processor 52 may similarly be implemented in either hardware or software or a combination of hardware and software components of the types described above.

As noted above, FIG. 1 shows a certain configuration in which the signature method described herein may be applied. The same method may be applied for authenticating signed blocks of the data stream 30 transmitted over a network. For the sake of convenience and clarity, the embodiments and claims herein refer to computation of a signature over the blocks of the data stream 30, but the terms "block" and "data stream" should be understood, in the context of the present patent application and in the claims, as referring to any sort of data that is amenable to signature by the present method.

Figure 2:
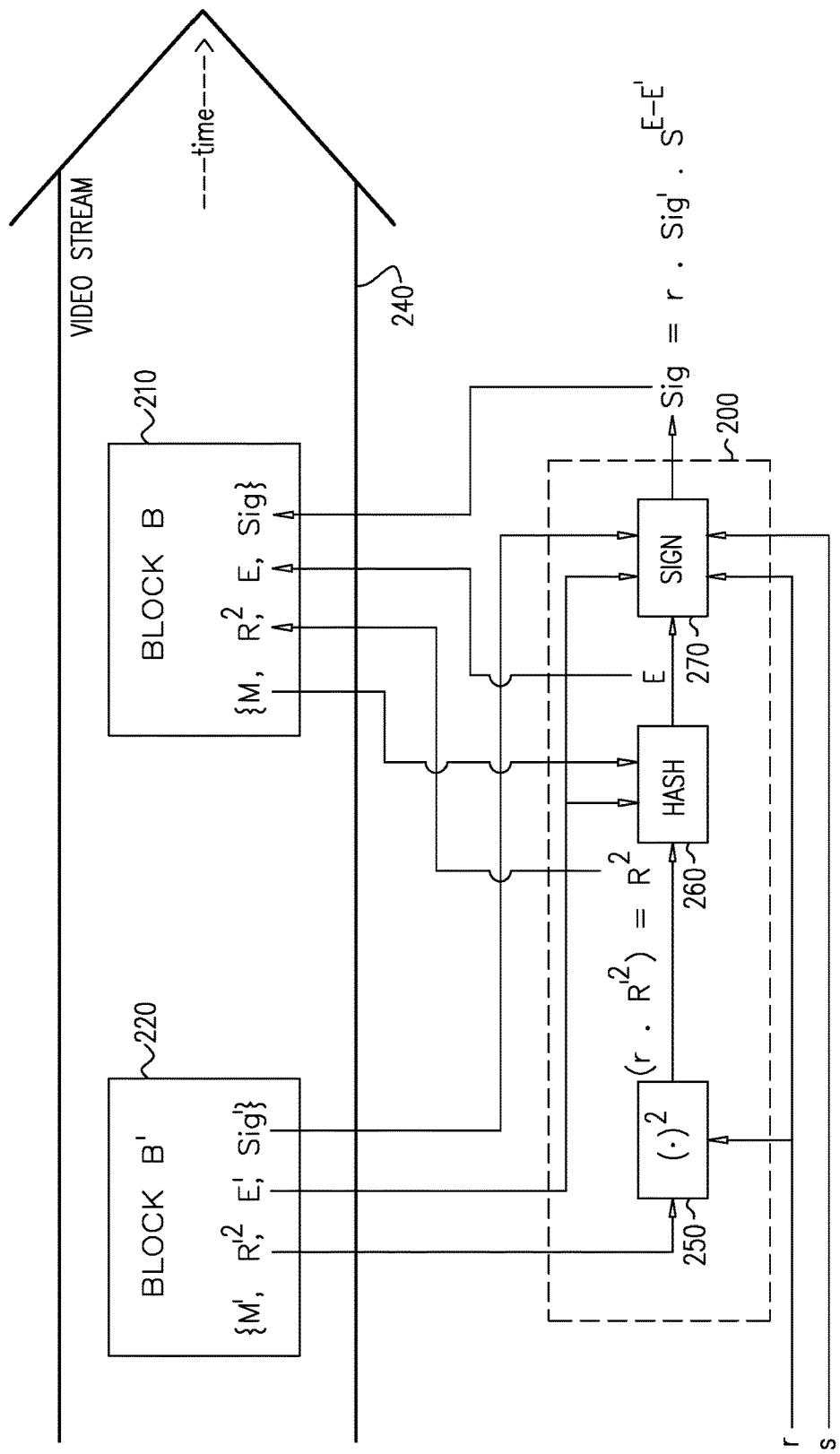
FIG. 2 is a block diagram of a system for signing a message block, where a single signer signs many messages blocks in the system of FIG. 1.

Reference is now made to FIG. 2, which is a block diagram of a system 200 for signing a message block, B, 210 (e.g. one of the blocks 35A, 35B, 35C, prior to the signing of that block, where a single signer (e.g., signer 20 of FIG. 1) signs many messages blocks in the system of FIG. 1. In the depicted embodiment, the message block, B, 210, is signed by the signing system 200 using the signing-data of its previous block, i.e. message block, B', 220.

In the Feige-Fiat-Shamir signature method, by way of background to FIG. 2, operations are mod N for some public value of N, where N=P·Q, and both P and Q are prime numbers which are secret. The signer has signing secret set of mod N values $S=\{S_1, S_2, S_3, \ldots S_j, \ldots S_k\}$, where $S_j$ is a random value in some field $Z^*_N$. The signer has a set of public values, V, such that $S_i^2 \cdot V_i = 1$ mod N. For a given message M, the signer selects a random number R mod N and computes a K-bit vector (e.g., a 64 bit vector), E, such that $E=(e_1, e_2, e_3, \ldots, e_k)=\text{Hash}(R^2\|M)$ and, the signature, $\text{Sig}=R \cdot \Pi_{i=1}^{64} S_i^{e_i}$. It is appreciated that in typical embodiments herein the terms "random value", "random number", "random nonce" and so forth, may in practice be a pseudo-random number, value or nonce.

Those of skill in the art will appreciate that the term "hash", as used above, refers to an appropriate one way function, typically referred to as a hash function (e.g., SHA-1, MD2, etc.).

The signer sends [E, Sig, M] to a verifier (mentioned above in the description of FIG. 1 as being, for example, the receiving device 50). The verifier then uses the public values V, and verifies that:

the received $E=(e_1,e_2,e_3,\ldots,e_k)$=Hash $(Sig^2 \cdot \Pi_{i=1}^{64} S_i^{e_i} \mod N \| [M])$ Those of skill in the art will appreciate that Feige-Fiat-Shamir signatures are believed secure due to the difficulty involved in finding S (i.e., factoring N is considered difficult), and the hash function used is believed a robust, one way function.

Returning to the discussion of FIG. 2, for a video stream 240 comprising a large number of blocks of data, such as blocks B 210 and B' 220, each "current" block of video data, B, (i.e. the block being signed at the present time), is signed using signature data from the "previous" block, B' (i.e. the previously signed block). Each block B 210 and B' 220 may be expressed as a string of bits. Because the string of bits associated with such blocks of data are typically very long, the strings of bits of data B 210 and B' 220 are hashed, yielding, respectively, hashed message blocks M and M'. It is appreciated, however, when the blocks of data are short—for example, shorter (i.e. fewer bits in length) than a hash of the block of data, the actual block B 210 or B' 220 may be used for M and M'

Accordingly, the "current" block, B 210, has the following parameters associated with it: M, $R^2$, E, and Sig. Similarly, the "previous" block, B' 220, has its corresponding associated parameters: M', $R'^2$, E', and Sig'. The following steps show how the signature, Sig is determined for a block B. The value r is a nonce used for generation of the signature.

$$R^2=r^2 R'^2;$$

$$E=\text{Hash}(R^2\|M\|E'); \text{ and}$$

$$Sig=r \cdot Sig' S^{E-E'}.$$

The parameters M, $R^2$, E, and Sig for block B 210 and the parameters M', $R'^2$, E', and Sig' for block B' 220 comprise metadata associated with each of the blocks. Embodiments of the method described herein may be viewed as embodiments of a method of generation of the parameters. The metadata for each block of data typically also comprises unique information about the block with which it is associated, for example, and without limiting the generality of the foregoing, a block number.

The metadata is sent from the signer 20 (FIG. 1) to the receiving device 50 (FIG. 1) as a second stream in tandem with the video stream. The sending of the metadata may be in-band sending, where the metadata is sent in the same stream as the blocks B 210 and B' 220. In alternative embodiments, the metadata may be sent out-of-band, in a separate manner, unrelated to the sending of the blocks B 210 and B' 220. For example, blocks B 210 and B' 220 may be streamed as part of a video stream to the receiving device 50 (FIG. 1), while the metadata may be sent in a signed and encrypted email to the receiving device 50 (FIG. 1).

The signing system 200 is depicted in FIG. 2 in a functional manner. That is to say, the inputs r and $R'^2$ are input into a squaring function 250, which outputs $R^2=r^2 R'^2$. The output $R^2$ is then input into a hashing function 260 which, along with inputs M and E' outputs $E=\text{Hash}(R^2\|M\|E')$. E is then input into a signing function 270, along with inputs r, Sig', S and E'. The signing system 200 typically comprises dedicated hardware logic circuits, in the form of an application-specific integrated circuit (ASIC), field programmable gate array (FPGA), or full-custom integrated circuit, or a combination of such devices. Alternatively or additionally, some or all of the functions of the signing system 200 may be carried out by a programmable processor, such as a microprocessor or digital signal processor (DSP), under the control of suitable software. This software may be downloaded to the processor in electronic form, over a network, for example. Alternatively or additionally, the software may be stored on tangible storage media, such as optical, magnetic, or electronic memory media.

It will be appreciated that the initial block has no previous block, and therefore, a "null" template needs to be provided to sign the initial block, in lieu of block B'. In other words, there exists, for a streamed video at least one (and typically only one) block B for which there is no block B'. This particular initial block will be provided with the following values in lieu of the values which would ordinarily be provided by B':

| Parameter | Value |
| --- | --- |
| M' | some arbitrary value |
| R' | 1 |
| E' | K-bit vector, where all K of the values are zero. |
| Sig' | 1 |

It is appreciated that other appropriate values may also be used to provide the values which are used in lieu of the values of B' in formulating the signature of B. The values provided in the above table are by way of example. It is appreciated that, regardless of the values used for the first block, r', and any subsequent r are a non-zero random nonce.

Figure 3:
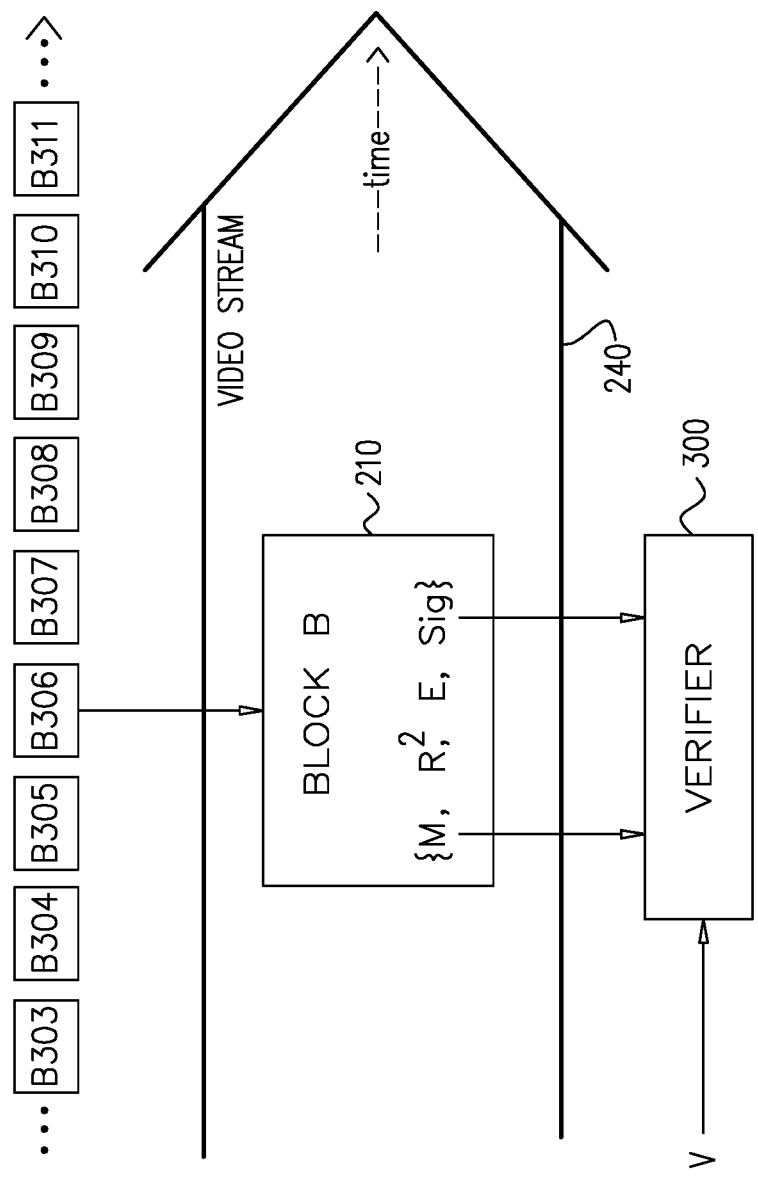
FIG. 3 is a block diagram of a verifier for verifying a signature of a signed message block in the system of FIG. 1.

Reference is now made to FIG. 3, which is a block diagram of a verifier 300 for verifying a signature of a signed message block in the system of FIG. 1. The verifier 300 is a system for verifying a signature of a signed message block, and is typically disposed in a receiving device which receives the signed blocks . . . , B', B, . . . from the signing system 200. As was mentioned above, the signer of the message (such as signing system 200), in this case, message block B 210 (FIG. 2), sends [E, Sig, M] to the verifier 300. [E, Sig, M] may be considered metadata associated with block B.

Authentication and verification of received blocks is performed by the verifier 300. At a first stage of authentication, the verifier 300 tests a small number of consecutive blocks (by way of a non-limiting example, from 6-20 blocks) in order to test correctness of the received data. In the exemplary embodiment depicted in FIG. 3, the receiving device has received at least consecutive message blocks B303-B311. The verifier may then begin authentication (ensuring that the data has been signed correctly) with the arbitrarily selected message block B306, which becomes, in the terminology used until now, block B. Accordingly, message block B305 becomes, in the terminology used until now, block B'. The verifier 300 then uses the metadata associated with the current blocks B and B' (i.e., message blocks B306 and B305, respectively), in order to authenticate the received stream of blocks.

At a first stage, the verifier 300 confirms that the result of the hash function: Hash(R'2∥M'∥E") is equal to E'. That is to say, since the verifier 300 has message block 305, which is now considered block B', once the verifier receives the metadata for block B', and can therefore retrieve the values of $R'^2$ and M' from message block 305. With the values of E", which the verifier 300 is able to retrieve from message block 304, the verifier 300 is now able to determine the value of Hash($R'^2$||M'||E"), and compare the resulting value of the hash function with the received value of E', received with block B', i.e. message block 305. This process of confirming the values of the K-bit vector, E, is performed for several consecutive blocks, e.g., B303-B309, as mentioned above.

Once the received video stream 240 is authenticated, the verifier 300 then verifies the signature of one of the blocks, i.e., in the present example, message block 306. The verifier 300 calculates the value of hash($Sig^2 \cdot V^E$ mod N||M||E'). This value is compared to E. If the two values match, then the signature of block B, i.e. message block B306 in the present example, will be verified. Because each signature operation and verification operation require that information the previous message block be used in the operation (i.e. signing or verifying block B requires information from block B'), once the signature of block B is verified, then the signature of all previous blocks is also verified.

It is appreciated that the above described method enables performing the computationally difficult step of determining $V^E = V_i^{e_i}$ (corresponding to the $\Pi_{i=1}^{64} S_i^{e_i}$ of the Feige-Fiat-Shamir signature method described above) only once by the verifier 300 for each signature verification operation. However, the single verification operation verifies the signatures of all of the message blocks which precede it in the video stream.

Figure 4:
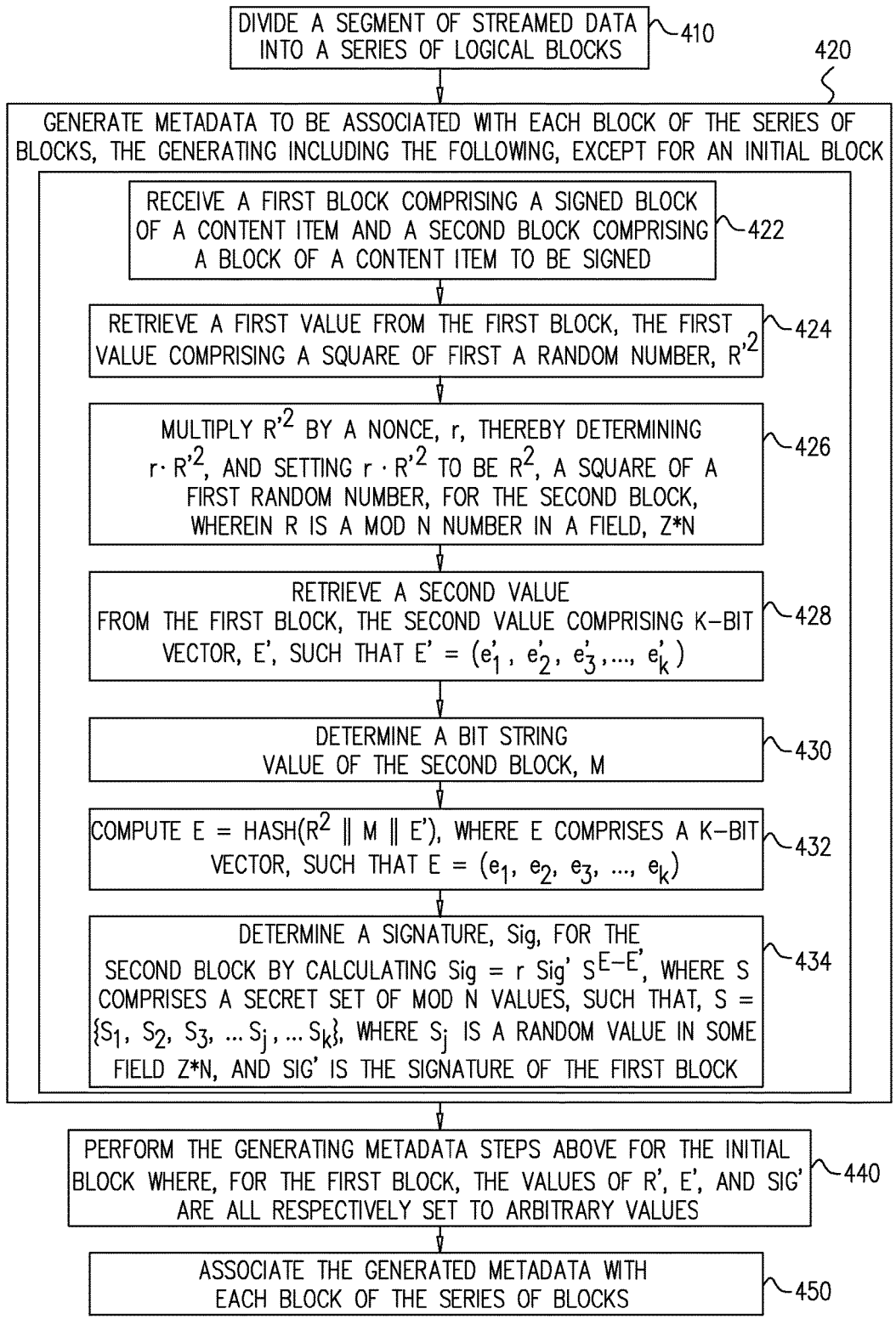
FIG. 4 is a flow chart of one method for signing a series of message blocks, according to an embodiment described herein.

Reference is now made to FIG. 4, which is a flow chart of one method for signing a series of message blocks, according to an embodiment described herein. At step 410, a segment of streamed data is divided into a series of logical blocks. It is appreciated that step 410 is optional. Metadata to be associated with each block of the series of blocks is then generated (step 420). The following steps (422-434) enumerate an example of how the metadata is generated. The metadata for first block of the series of message blocks is generated as will be explained below, in step 440.

In step 422, a first block comprising a signed block of a content item and a second block comprising a block of a content item to be signed is received. A first value is then retrieved from the first block (step 424), the first value comprising a square of first a random number, $R'^2$. In step 426, $R'^2$ is multiplied by a nonce, r. The value of $r \cdot R'^2$ is set to be equal to $R^2$, a square of first a random number, for the second block, wherein R is a mod N number in a field, Z*N. A second value is retrieved from the first block (step 428), the second value comprising a K-bit vector, E', such that $E'=e'(e'_1, e'_2, e'_3, \ldots, e'_k)$. In step 430 a bit string value, M, of the second block is determined. A result of a hash function, E=HASH($R2$||M||E'), is computed at step 432, where E is a K-bit vector, such that $E=(e_1, e_2, e_3, \ldots, e_k)$. A signature, Sig, for the second block is determined at step 434. The signature is calculated by calculating Sig= r Sig'$S^{E-E'}$, where S comprises a secret set of mod N values, such that, $S=\{S_1, S_2, S_3, \ldots S_j, \ldots S_k\}$, where $S_j$ is a random value in a field Z*N, and SIG' is the signature of the first block.

The generating metadata steps (i.e. steps 422-434) are performed for the first block, where, for the first block, the values of E', and SIG' are all respectively set to arbitrary values (step 440). Finally, at step 450, the generated metadata is associated with each block of the series of blocks.

Figure 5:
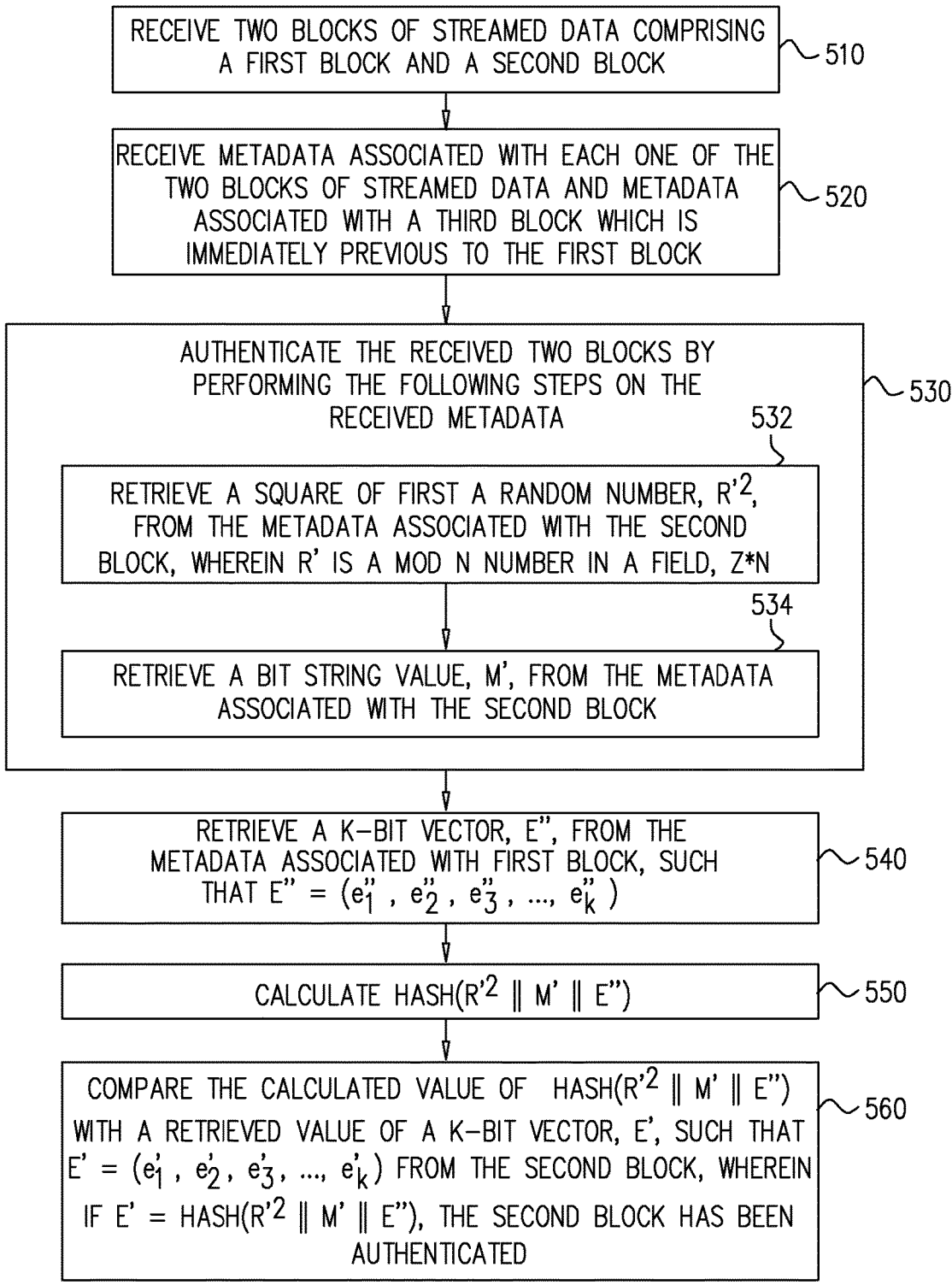
FIG. 5 is a flow chart of one method for authenticating a block signed according to an embodiment described herein.

Reference is now made to FIG. 5, which is a flow chart of one method for authenticating a block signed according to an embodiment described herein. At step 510, two blocks of streamed data comprising a first block and a second block are received. Metadata associated with each one of the two blocks of streamed data, and metadata associated with a third block which is immediately previous to the first block is received (step 520). At step 530 the received two blocks are authenticated by performing the following steps 532 and 534 on the received metadata. A square of first a random number, $R'^2$, is retrieved from the metadata associated with the second block, wherein R' is a mod N number in a field, Z*N (step 532). A bit string value, M', is retrieved from the metadata associated with the second block (step 534). At step 540 a K-bit vector, E", is retrieved from the metadata associated with first block, such that $E''=(e''_1, e''_2, e''_3, \ldots, e''_k)$.

At step 550, HASH($R'^2$||M'||E") is calculated. The resulting calculated value of HASH($R'^2$||M'||E") is compared with a value retrieved from the second block, the value being of a k-bit vector, E', such that $E'=(e'_1, e'_2, e'_3, \ldots, e'_k)$ wherein if =HASH(R'2||M'||E"), the second block has been authenticated (step 560).

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for digitally signing blocks of data, the method comprising:

generating, by a signing device, metadata to be associated with each block of a series of blocks of data, the generating comprising the following, except for an initial block:

receiving at the signing device: a first block, comprising a signed block of a content item; and a second block comprising a block of a content item to be signed;

retrieving a first value from the first block, the first value comprising a square of a first random number, $R'^2$;

multiplying $R'^2$ by a non-zero nonce, r, thereby determining $r \cdot R'^2$, and setting $r \cdot R'^2$ to be a square of a first random number, denoted $R^2$, for the second block, wherein R is a mod N number in a field, Z*N;

retrieving a second value from the first block, the second value comprising K-bit vector, E', such that $E'=(e'_1, e'_2, e'_3, \ldots, e'_k)$;

determining a bit string value of the second block, M;

computing E=hash($R^2$||M||E'), where E comprises a K-bit vector, such that $E=(e_1, e_2, e_3, \ldots, e_k)$; and determining a signature, Sig, for the second block by calculating Sig=r Sig' $S^{E-E}$ where S comprises a secret set of mod N values, such that, $S=\{S_1, S_2, S_3, \ldots S_j, \ldots S_k\}$, where $S_j$ is a random value in the field $Z*N$, and Sig' is the signature of the first block;

performing the generating metadata steps above for the initial block where, for the first block, the values of $R'^2$, E', and Sig' are each respectively set to non-zero arbitrary values;

associating the metadata with each block of the series of blocks of data; and transmitting the metadata and the series of blocks of data for verification.

2. The method according to claim 1 and further comprising logically dividing a segment of streamed data into the series of blocks of data.

3. The method according to claim 1 wherein the generating metadata comprises adding unique information into the metadata for each block of the series of blocks of data.

4. The method according to claim 3 wherein the unique information comprises a block number.

5. The method according to claim 1 and wherein the bit string value of the second block, M, comprises a result of a hash string value of the second block.

6. The method according to claim 1 and wherein the bit string value, M, comprises the bit string of the second block.

7. The method according to claim 1 and wherein, for the metadata of the initial block, at least one of: R'=1; Sig'=1; or E' is a K-bit vector, where all K of the values are zero.

8. The method according to claim 1 and wherein for the initial block, the values of R', E', and Sig' are all respectively set to non-zero random values.

9. The method according to claim 1 wherein the series of blocks of data is a portion of streamed data, wherein the streamed data comprises live streamed data.

10. The method according to claim 1 wherein the series of blocks of data is a portion of streamed data, wherein the streamed data comprises recorded streamed data.

11. A method comprising:

receiving two blocks of streamed data comprising a first block and a second block;

receiving metadata associated with each one of the two blocks of streamed data and metadata associated with a third block which is immediately previous to the first block;

authenticating the received two blocks by performing the following steps on the received metadata:

retrieving a square of a first random number, $R'^2$, from the metadata associated with the second block, wherein R' is a mod N number in a field, $Z*N$;

retrieving a bit string value, M', from the metadata associated with the second block;

retrieving a K-bit vector, E'', such that $E''=(e''_1, e''_2, e''_3, \ldots, e''_k)$ from the metadata associated with the first block;

calculating Hash($R'^2 \| M' \| E''$); and comparing the calculated value of Hash($R'^2 \| M' \| E''$) with a value of a K-bit vector, E', retrieved from the second block, such that $E'=(e'_1, e'_2, e'_3, \ldots, e'_k)$, wherein if E'=Hash($R'^2 \| M' \| E''$), the second block has been authenticated.

12. The method according to claim 11, and further comprising:

calculating a value of hash($Sig_2 \cdot V^E$ mod $N \| M \| E'$), where Sig denotes a signature of the second block, M denotes a bit string value of the second block, and V comprises a set of public values, such that $Si^2 \cdot Vi=1$ mod N, and S comprises a secret set of mod N values, such that $S=\{S_1, S_2, S_3, \ldots S_j, \ldots S_k\}$, where $S_j$ is a random value in some field $Z*N$, and $E=(e_1, e_2, e_3, \ldots, e_k)$, wherein $V^E=\Pi_{i=1}^{K} V_i^{ei}$, such that if hash($Sig^2 \cdot V^E$ mod $N \| M \| E'$)=E, then the signature of the first block, the second block, and the third block are all verified.

13. The method according to claim 12 wherein the metadata comprises unique information for each block of the series of blocks.

14. The method according to claim 13 wherein the unique information comprises a block number.

15. The method of claim 11 and wherein the bit string value, M', comprises a result of a hash string value of the bit string value of the second block.

16. The method of claim 11 and wherein the bit string value, M', comprises the bit string of the second block.

17. The method of claim 11 and wherein, for the metadata associated with the first block, at least one of the following is true: $R'^2=1$; Sig'=1; or E' is a K-bit vector, where all K of the values are zero.

18. The method according to claim 11 wherein the streamed data comprises live streamed data.

19. The method according to claim 11 wherein the streamed data comprises recorded streamed data.

20. A system comprising:

an interface operative to receive two blocks of streamed data comprising a first block and a second block;

a second interface operative to receive metadata associated with each one of the two blocks of streamed data and metadata associated with a third block which is immediately previous to the first block;

a processor operative to:

retrieve a square of a first random number, $R'^2$, from the metadata associated with the second block, wherein R' is a mod N number in a field, $Z*N$;

retrieve a bit string value, M', from the metadata associated with the second block;

retrieve a K-bit vector, E'', such that $E''=(e''_1, e''_2, e''_3, \ldots, e''_k)$ from the metadata associated with the first block;

calculate Hash($R'^2 \| M' \| E''$); and compare the calculated value of Hash($R'^2 \| M' \| E''$) with a value of a K-bit vector, E', retrieved from the second block, such that $E'=(e'_1, e'_2, e'_3, \ldots, e'_k)$, wherein, the processor has authenticated the received two blocks if E'=Hash($R'2 \| M' \| E''$).

* * * * *